(12) United States Patent
Yamada et al.

(10) Patent No.: US 8,506,168 B2
(45) Date of Patent: Aug. 13, 2013

(54) DISK DRIVE DEVICE IMPROVED IN ANTI-VIBRATION CHARACTERISTIC

(75) Inventors: Takuji Yamada, Shizuoka (JP); Mitsuo Kodama, Shizuoka (JP)

(73) Assignee: Samsung Electro-Mechanics Japan Advanced Technology Co., Ltd., Shizuoka (JP)

(*) Notice: Subject to any disclaimer, the term of this patent is extended or adjusted under 35 U.S.C. 154(b) by 232 days.

(21) Appl. No.: 12/838,375

(22) Filed: Jul. 16, 2010

(65) Prior Publication Data

US 2011/0033143 A1  Feb. 10, 2011

(30) Foreign Application Priority Data

Aug. 4, 2009  (JP) ................................. 2009-181545

(51) Int. Cl.
*F16C 32/06* (2006.01)
*H02K 5/16* (2006.01)

(52) U.S. Cl.
USPC .............................. 384/121; 384/107; 310/90

(58) Field of Classification Search
USPC ................ 384/100–124; 310/90; 360/99.08, 360/98.07, 99.04
See application file for complete search history.

(56) References Cited

U.S. PATENT DOCUMENTS

| | | | |
|---|---|---|---|
| 7,237,956 B2* | 7/2007 | Asada et al. .................. | 384/107 |
| 7,265,469 B2* | 9/2007 | Kodama ........................ | 310/90 |
| 7,318,674 B2* | 1/2008 | Aiello .......................... | 384/112 |
| 7,489,059 B2* | 2/2009 | Yajima ......................... | 310/90 |
| 8,128,289 B2* | 3/2012 | Yamamoto et al. ........... | 384/107 |
| 2008/0309183 A1* | 12/2008 | Murakami et al. ............ | 310/90 |

FOREIGN PATENT DOCUMENTS

| | | | |
|---|---|---|---|
| JP | 10269691 A | * | 10/1998 |
| JP | 11153130 A | | 6/1999 |
| JP | 2007-198555 | | 8/2007 |
| JP | 2008092790 A | | 4/2008 |
| WO | WO 2008001513 A1 | * | 1/2008 |

OTHER PUBLICATIONS

JPO, Office Action in counterpart Japanese Patent Application No. 2009-181545 dated Mar. 27, 2013.

* cited by examiner

*Primary Examiner* — Alan Waits
(74) *Attorney, Agent, or Firm* — Fulwider Patton LLP

(57) ABSTRACT

A disk drive device includes a rotating body, a fluid dynamic bearing unit that rotatably supports the rotating body, and a drive unit. The fluid dynamic bearing unit has: a lubricant holding portion in which lubricant is held; a first thrust dynamic pressure groove with which a first thrust dynamic pressure generating portion for generating the dynamic pressure in the pump-in direction, which is oriented toward the inside of the lubricant holding portion, is structured; and a second thrust dynamic pressure groove with which a second thrust dynamic pressure generating portion for generating at least the dynamic pressure in the pump-out direction, is structured. The first thrust dynamic pressure generating portion and the second thrust dynamic pressure generating portion have dynamic pressure generation characteristics in which, when the rotating body is biased in the rotational axis direction from the state where the rotating body is floating in the lubricant, the sum of the changes in the dynamic pressure in the pump-out direction is larger than that of the changes in the dynamic pressure in the pump-in direction.

16 Claims, 12 Drawing Sheets

DISK DRIVE DEVICE IMPROVED IN ANTI-VIBRATION CHARACTERISTIC

CROSS-REFERENCE TO RELATED APPLICATION

This application is based upon and claims the benefit of priority from the prior Japanese Patent Application No. 2009-181545, filed on Aug. 4, 2009, the entire content of which is incorporated herein by reference.

BACKGROUND OF THE INVENTION

1. Field of the Invention

The present invention relates to a disk drive device, in particular, to a disk drive device in which its anti-vibration characteristic is improved while reducing a drive current.

2. Description of the Related Art

In recent years, disk drive devices, such as Hard Disk Drives (HDDs), have been developed to be small in size and large in capacity, and been widely used in many electrical appliances. Therefore, disk drive devices have been used in a wide variety of environments. In particular, disk drive devices are being mounted in portable devices called mobile devices. Mobile devices are frequently used in environments with a lot of vibrations, and therefore the disk drive devices to be mounted in the mobile devices are demanded to have a characteristic in which read/write of data can be stably performed even when used in an environment with a lot of vibrations. In order to meet such a demand, there is a disk drive device in which a fluid dynamic bearing unit is mounted in which high-speed rotation can be stably performed. For example, Japanese Patent Application Publication No. 2007-198555 discloses an example of the structure of a fluid dynamic bearing unit, in which a flange forming part of a rotating body is arranged in the space between a sleeve forming part of a stator and a housing. By structuring a fluid dynamic bearing with the spaces between the flange and the sleeve and between the flange and the housing being filled with lubricant, smooth high-speed rotation of the rotating body is realized.

Because it is considered to be important that mobile devices are small in size, batteries for the mobile devices are often made small with the miniaturization of the mobile devices. As a result, it is often demanded that a drive current should be reduced when a disk drive device is to be mounted in a mobile device. If a drive current for a disk drive device is reduced, the dynamic pressure generated by a fluid dynamic bearing unit is decreased accordingly, resulting in a decrease in the stiffness of the fluid dynamic bearing unit. If the stiffness of a fluid dynamic bearing unit is decreased, a displacement in the axial direction of a rotating body including a recording disk becomes large when the disk drive device has vibrated. If a displacement of a recording disk becomes large, the relative distance between the recording disk and a magnetic head becomes unstable, thereby causing the problem that an increase in errors in reading/writing data may be incurred.

SUMMARY OF THE INVENTION

The present invention has been made in view of these situations, and a purpose of the invention is to provide a disk drive device in which, when a drive current is reduced, the stiffness of a fluid dynamic bearing unit is maintained and therefore read/write of data can be stably performed even under an environment with a lot of vibrations.

In order to solve the aforementioned problems, a disk drive device according to an embodiment of the present invention comprises: a base member; a rotating body on which a recording disk is to be mounted; a bearing unit that is arranged on the base member and is configured to rotatably support the rotating body; and a drive unit configured to rotate the rotating body. The bearing unit includes: a lubricant holding portion in which lubricant is held between at least part of the base member and at least part of the rotating body; a first thrust dynamic pressure generating portion configured to generate the dynamic pressure in the pump-in direction, which is oriented from an open end portion formed in part of the lubricant holding portion toward the inside of the lubricant holding portion; and a second thrust dynamic pressure generating portion configured to generate at least the dynamic pressure in the pump-out direction, which is opposite to the dynamic pressure in the pump-in direction. The first thrust dynamic pressure generating portion and the second thrust dynamic pressure generating portion have dynamic pressure generation characteristics in which, when the rotating body is biased in the rotational axis direction from the state where the rotating body is floating in the lubricant, the sum of the changes in the dynamic pressure in the pump-out direction is larger than that of the changes in the dynamic pressure in the pump-in direction.

The rotating body generates thrust dynamic pressure in the lubricant and floats therein by rotating at a predetermined rotating speed or more. At the time, if the stiffness in the thrust direction of a bearing unit is decreased due to a reduction in a drive current, the space where the lubricant is present, in the first thrust dynamic pressure generating portion or in the second thrust dynamic pressure generating portion, becomes narrow because the rotating body is biased in the rotational axis direction. As a result, the thrust dynamic pressure becomes large due to the bias of the rotating body, resulting in a phenomenon in which the floating force of the rotating body is increased and the bias is accelerated. In other words, the dynamic pressure in the pump-in direction is excessively increased and maintenance of a balanced floating posture is hampered, thereby causing a state in which the stiffness of the bearing unit is substantially decreased. In addition, the gap between the rotating body and a fixed body facing the rotating body, in the first thrust dynamic pressure generating portion or in the second thrust dynamic pressure generating portion, becomes scarce due to an excessive bias of the rotating body, thereby sometimes causing a contact between the surface of the fixed body and that of the rotating body. In this case, not only an increase in a drive current due to an increase in load or a decrease in the lifetime due to wear are caused, but also deterioration in the rotational accuracy, etc., is caused due to the contact, thereby possibly causing an increase in errors in reading/writing data. Accordingly, with a bearing unit having a dynamic pressure generation characteristic in which, when a rotating body is biased in the rotational axis direction from the state where the rotating body is floating in lubricant, the sum of the changes in the dynamic pressure in the pump-out direction is larger than that of the changes in the dynamic pressure in the pump-in direction, an increase in the dynamic pressure in the pump-in direction as the whole bearing unit is suppressed. As a result, an excessive increase in the floating force, occurring while the rotating body is floating, can be suppressed. That is, a bias of the rotating body can be suppressed, and accordingly, a bearing unit with high stiffness by which the rotating body is hardly biased can be formed. Therefore, the relative distance between a recording disk and a magnetic head is stabilized and read/write of data can be stably performed even under an environment with a lot of vibrations.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Hereinafter, embodiments of the present invention will be described based on the accompanying drawings. The present embodiments are adopted in brushless motors that are to be mounted on hard disk drive devices (sometimes referred to as HDDs or disk drive devices) to drive recording disks, or in disk drive motors that are to be mounted in optical disk recording and reproducing devices (also simply referred to as disk drive devices), such as CD (Compact Disc) devices and DVD (Digital Versatile Disc) devices.

Figure 1:
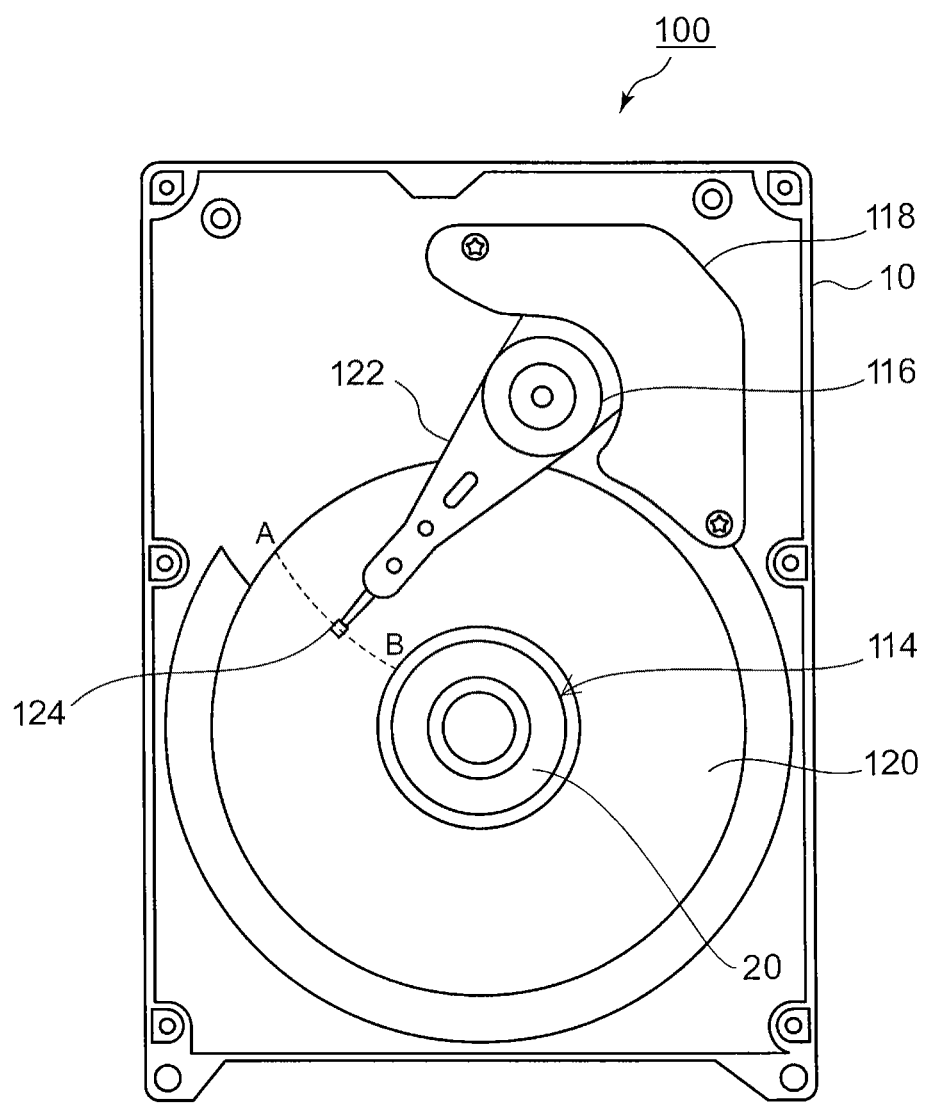
FIG. 1 is an illustrative view illustrating the internal structure of an HDD, an example of a disk drive device according to the present embodiment.

FIG. 1 is an illustrative view illustrating the internal structure of an HDD 100 (hereinafter referred to as a disk drive device 100), an example of a disk drive device according to the present embodiment. FIG. 1 illustrates the state where a cover is removed in order to expose the internal structure.

A brushless motor 114, an arm bearing unit 116, and a voice coil motor 118, etc., are mounted on the upper surface of a base member 10. The brushless motor 114 supports, on the same rotational axis, a hub 20 on which a recording disk 120 is to be mounted, so that the recording disk 120 on which data can be recorded, for example, magnetically, is rotationally driven. The brushless motor 114 can be replaced with, for example, a spindle motor. The brushless motor 114 is driven with a three-phase drive current consisting of a U-phase, a V-phase, and a W-phase. The arm bearing unit 116 supports a swing arm 122 in a swing-free manner within a movable range AB. The voice coil motor 118 makes the swing arm 122 swing in accordance with external control data. A magnetic head 124 is fixed to the tip of the swing arm 122. When the disk drive device 100 is in an operation state, the magnetic head 124 moves, with a swing of the swing arm 122, above the surface of the recording disk 20 with a slight gap between them and within the movable range AB, thereby reading/writing data. In FIG. 1, the point A corresponds to the position of the outermost recording track of the recording disk 120 and the point B corresponds to that of the innermost recording track thereof. When the disk drive device 100 is in a stopped state, the swing arm 122 may be transferred to the waiting position provided in the side of the recording disk 120.

In the present embodiment, the device, including all of the components for reading/writing data, such as the recording disk 120, the swing arm 122, the magnetic head 124, and the voice coil motor 118, etc., is sometimes expressed as a disk drive device, or sometimes expressed as an HDD. Alternatively, only the parts for rotationally driving the recording disk 120 are sometimes expressed as a disk drive device.

Figure 2:
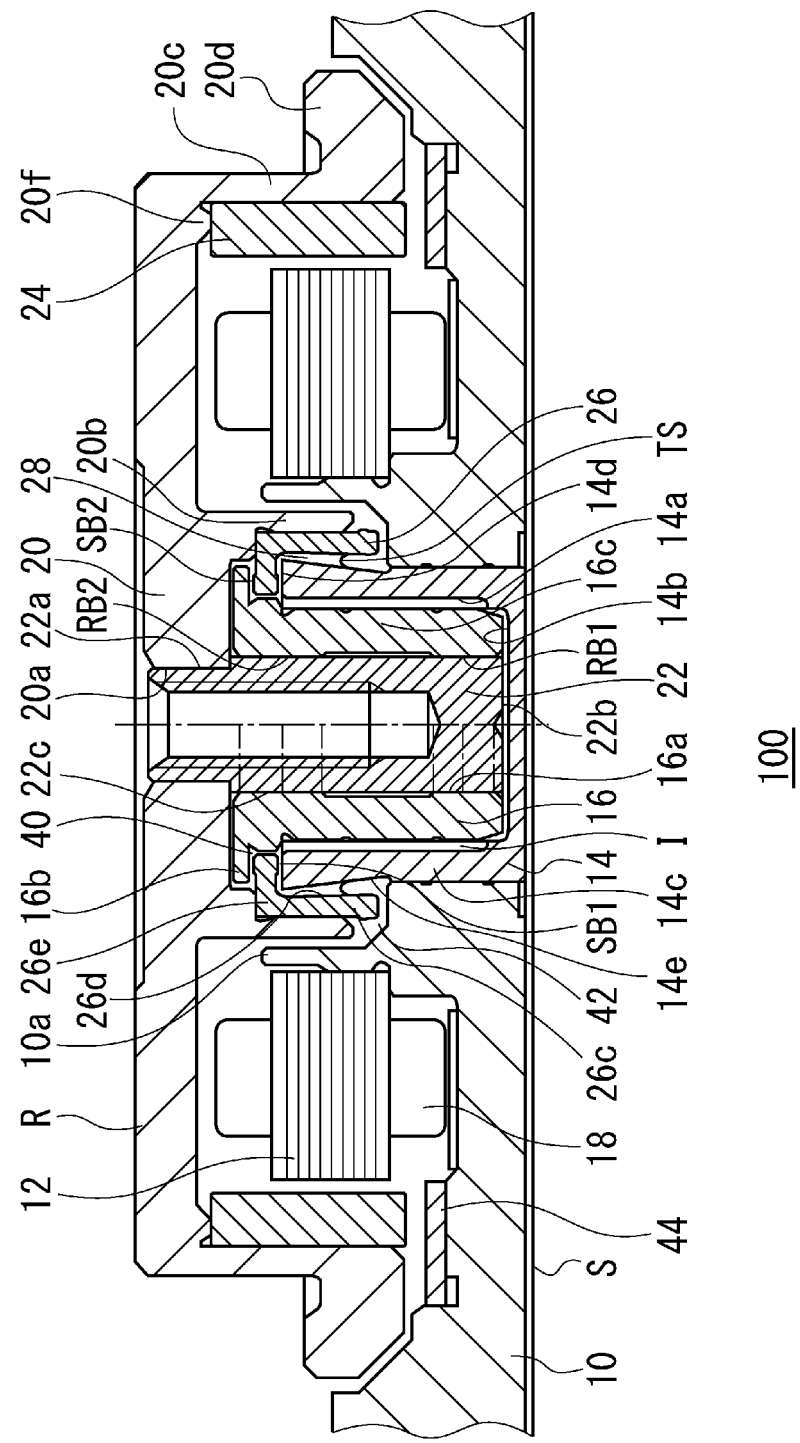
FIG. 2 is a schematic cross-sectional view of a brushless motor in the disk drive device according to the present embodiment.

FIG. 2 is a cross-sectional view taken along the axial direction of a shaft 22 in the disk drive device 100. The disk drive device 100 includes a fixed body S and a rotating body R. The fixed body S includes the base member 10, a stator core 12, a housing 14, and a sleeve 16; and the rotating body R includes the hub 20, the shaft 22, and a thrust member 26. The base member 10 includes a cylinder portion 10a, and the housing 14 includes a groove 14a, a bottom 14b, a cylinder portion 14c, and a housing flat portion 14d. The sleeve 16 includes a cylinder portion inner circumferential surface 16a, a circumferentially-extending portion 16b, and a cylinder portion 16c; and a coil 18 is wound around the stator core 12. The hub 20 includes a center hole 20a, a first cylinder portion 20b, a second cylinder portion 20c, a hub outward extending portion 20d, and a pedestal portion 20f. The shaft 22 includes a step portion 22a, a tip portion 22b and an outer circumferential surface 22c; and the thrust member 26 includes a hanging member 26c and a flange 26e. In the following descriptions, for convenience, the lower portion indicated in the view is expressed as the bottom and the upper portion as the top as a whole.

The base member 10 has a central hole and the cylinder portion 10a provided so as to surround the central hole. In the base member 10, the housing 14 is held by the central hole and the stator core 12 is fixed to the outer circumference of the cylinder portion 10a surrounding the hosing 14. An annular-shaped second area portion 42 is formed between the outer circumference of the housing 14 and the inner circumference of the cylinder portion 10a. The second area portion 42 has a shape to surround the central hole of the base member 10. The base member 10 is formed by cutting an aluminum die cast product or by pressing an aluminum plate or a nickel-plated steel plate.

The stator core 12 is fixed to the outer circumferential surface of the cylinder portion 10a. The stator core 12 is formed by performing insulation coating made by electro-deposition coating or powder coating, etc., on the surface thereof after a plurality of magnetic plates, such as ferrosilicon plates, are laminated. The stator core 12 is a ring-shaped member having a plurality of salient poles (not illustrated) protruding outwards, around each of which the coil 18 is wound. When the disk drive device 100 is, for example, three-phase driven, the number of the salient poles is designed to be nine. The wiring terminal of the coil 18 is soldered on an FPC (Flexible Printed Circuit) arranged on the bottom surface of the base member 10. The pulled-out wire terminal is fixed with adhesive so as not to unlay. The fixation is performed to prevent disconnection of the wire due to a vibration of large amplitude created by a resonance of the wire during ultrasonic wave cleaning. When a three-phase current having an approximate sine wave shape is applied to the coil 18 through the FPC by a predetermined drive circuit, the coil 18 generates a rotating magnetic field in the salient poles of the stator core 12. A rotating drive force is generated by the interaction between the driving magnetic poles of the magnet 24 and the rotating magnetic field, which rotates the rotating body R.

An attracting plate 44 is fixed to the position on the base member 10, the position facing the lower end surface in the axial direction of the ring-shaped magnet 24 via a gap. The attracting plate 44 is a ring-shaped member and is formed by pressing a soft magnetic material, for example, a cold-rolled steel plate. The attracting plate 44 generates a magnetic attracting force in the axial direction between the magnet 24 and itself. That is, the attracting plate 44 generates a force to float the hub in the direction opposite to a floating force that is applied to the rotating body R during the rotation. The rotating body R is made to rotate in a non-contact state with surrounding members with the floating force, the force to attract the hub, and the gravity applied to the rotating body R being balanced during the rotation of the rotating body R.

The housing 14 is fixed to the inner circumferential surface of the cylinder portion 10a by adhesion or press-fitting. The housing 14 is approximately cup-shaped, in which the cylinder portion 14c surrounding the sleeve 16, the housing flat portion 14d that is provided at the end on the hub 20 side and that has the surface faces to the axial direction, and the bottom 14b that seals the end of the cylinder portion 14c, the end being located on the side opposite to the housing flat portion 14d, are combined. With such a shape, the housing 14 is arranged such that the lower end of the sleeve 16 is sealed and the upper end thereof protrudes. In addition, the housing 14 may be formed with the bottom 14b and the cylinder portion 14c being formed integrally or with the bottom 14b and the cylinder portion 14c being fixed together as different members. The housing 14 may be formed of a copper-based alloy, a sintered alloy by powder metallurgy, stainless steel, or a plastic material, such as polyetherimide, polyimide, polyamide, etc. When a plastic material is to be used for the housing 14, it is desirable that carbon fiber is contained in the plastic material such that the specific resistance thereof is smaller than or equal to $10^6$ $\Omega \cdot m$ in order to secure the static eliminating performance of the disk drive device 100.

A groove 14a, extending in the axial direction, is formed on the inner circumferential surface of the housing 14. The groove 14a functions as a communication hole for communicating both end surface sides of the housing 14 when the sleeve 16 has been fit into the cylinder portion 14c. The communication hole becomes a communication channel I by being filled with lubricant 28. This communication channel I will be described later. The cross-sectional shape of the groove 14a may be a concave circular arc shape or a concave portion.

The sleeve 16 is fixed to the inner circumferential surface of the housing 14 by adhesion or press-fitting and is fixed on the same axis as that of the central hole of the base member 10. The sleeve 16 has a shape in which the annular cylinder portion 16c that supports the shaft 22 by the shaft 22 being housed therein, and a circumferentially-extending portion 16b that is extended in the outer diameter direction at the end on the hub 20 side of the cylinder portion 16c, are combined. In addition, the cylinder portion inner circumferential surface 16a is formed inside the cylinder portion 16c so as to surround the shaft 22. Herein, the circumferentially-extending portion 16b and the cylinder portion 16c may be formed integrally, or both may be formed by being fixed together as different members. An annular first area portion 40 is formed between the circumferentially-extending portion 16b and the cylinder portion 14c. The sleeve 16 is formed of a copper-based alloy, a sintered alloy by powder metallurgy, stainless steel, or a plastic material, such as polyetherimide, polyimide, polyamide, etc. When a plastic material is to be used for the sleeve 16, carbon fiber is contained in the plastic material such that the specific resistance thereof is smaller than or equal to $10^6$ $\Omega \cdot m$ in order to secure the static eliminating performance of the disk drive device 100.

The hub 20 is structured so as have the center hole 20a provided at the center thereof, the first cylinder portion 20b provided so as to surround the center hole 20a, the second cylinder portion 20c arranged outside the first cylinder portion 20b, and the hub outward extending portion 20d extending outward in the radial direction at the lower end of the second cylinder portion 20c. The hub 20 is approximately cup-shaped. The hub 20 has soft magnetism. For example, the hub 20 is formed of a steel material, such as SUS 430F, etc. The hub 20 is formed to have an approximately cup-shaped predetermined shape by pressing or cutting a steel plate. For example, the stainless steel with the product name of DHS1, supplied by Daido Steel Co., Ltd., is preferred in terms of less outgassing and easy processing. Similarly, the stainless steel with the product name of DHS2 is more preferred in terms of better corrosion resistance.

The thrust member 26 is fixed to the inner circumferential surface of the first cylinder portion 20b of the hub 20, and the magnet 24 is fixed to the inner circumferential surface of the second cylinder portion 20c. Herein, the magnet 24 is fixed to the annular portion that is concentric with the shaft 22 so as to face the stator core 12, which is fixed to the base member 10. With such a structure, the hub 20 rotates integrally with the shaft 22 to drive the non-illustrated recording disk 120. In addition, the hub 20 is formed of a magnetic stainless steel, and the non-illustrated recording disk 120 is mounted on the hub outward extending portion 20d with the center hole of the recording disk 120 being engaged with the outer circumferential surface of the second cylinder portion 20c.

The shaft 22 is fixed to the center hole 20a. Herein, the step portion 22a is provided at the upper end of the shaft 22 and the shaft 22 is press-fit into the center hole 20a when assembled. As a result, the hub 20 is restricted in the movement in the axial direction by the step portion 22a and is integrated with the shaft 22 at a predetermined right angle. The tip 22b side of the shaft 22 is housed within the inner circumference of the cylinder portion 16c. The shaft 22 is formed of a stainless steel material.

The thrust member 26 has the flange 26e surrounding the sleeve 16 and the hanging member 26c surrounding the housing 14. Herein, the flange 26e is fixed to the inner wall of the first cylinder portion 20b with adhesive and the hanging member 26c is bound to the outer edge portion of the flange 26e and is also fixed to the inner wall of the first cylinder portion 20b with adhesive. That is, the outer circumferential surface of the hanging member 26c is fixed to the inner circumferential surface of the first cylinder portion 20b by adhesion. Thus, the flange 26e surrounds the outer circumference of the cylinder portion 16c via a gap and is arranged above the lower surface of the circumferentially-extending portion 16b via a narrow gap. In addition, while the thrust member 26 is rotating integrally with the hub 20, the flange 26e rotates within the first area portion 40 and the hanging member 26c rotates within the second area portion 42.

Figure 3:
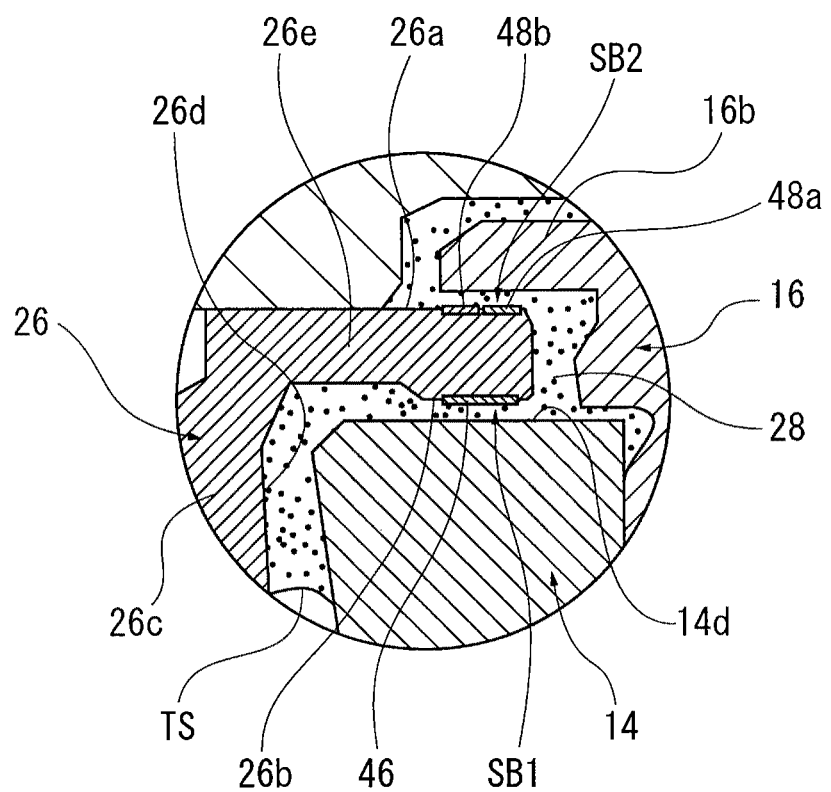
FIG. 3 is an enlarged view of a first thrust dynamic pressure generating portion and a second thrust dynamic pressure generating portion in the disk drive device according to the present embodiment.

As illustrated in FIG. 3, the flange 26e has a shape having a thrust upper surface 26a and a thrust lower surface 26b, the shape being thin in the axial direction. The hanging member 26c extends in the axial direction from the lower surface near to the outer circumference of the flange 26e. A first thrust dynamic pressure generating portion (first thrust dynamic pressure bearing SB1) comprises the thrust lower surface 26b of the flange 26e and the housing flat portion 14d, which is the upper end portion of the housing 14; and a second thrust dynamic pressure generating portion (second thrust dynamic pressure bearing SB2) comprises the thrust upper surface 26a of the flange 26e and the lower surface of the circumferentially-extending portion 16b. The thrust member 26 is formed by combining the flange 26e with the hanging member 26c and has a so-called inverted L-shaped cross section in which the alphabetical capital letter "L" is inverted upside down, as illustrated in FIG. 2. Herein, the length in the axial direction of the hanging member 26c is larger than that in the axial direction of the flange 26e. The inner circumferential surface 26d of the hanging member 26c is tapered in which the radius thereof is reduced toward the opposite side of the flange 26e and structures a capillary seal portion TS, which will be described later. With such a shape, the thrust member 26 can be easily and inexpensively processed. Further, even if the thrust member 26 becomes miniaturized and thin, the thrust member 26 can be processed with good dimension accuracy. As a result, there are effects that the disk drive device 100 can be miniaturized and reduced in weight.

The thrust member 26 has the function of preventing the rotating body R from coming off the fixed body S other than structuring a thrust dynamic pressure generating portion. If the rotating body R and the fixed body S are relatively transferred due to an impact, the flange 26e will be in contact with the lower surface of the circumferentially-extending portion 16b. As a result, the thrust member 26 receives stress in the direction of coming off the first cylinder portion 20b. Because the bonding strength between the hanging member 26c and the first cylinder portion 20b becomes weak if the bonding distance between the two is short, the possibility that the bonding may be destroyed even by a small impact becomes high. That is, as the bonding distance between the hanging member 26c and the first cylinder portion 20b is made longer, the bonding becomes stronger against an impact.

On the other hand, when the flange 26e becomes thick, a capillary seal portion becomes short, thereby causing the amount of the lubricant 28 that can be held in the capillary seal portion to be small. Accordingly, there is the possibility that, when the lubricant 28 is dispersed due to an impact, the lubricant 28 may be immediately lacking. The functions of a fluid dynamic bearing are deteriorated due to such a lack in the lubricant and therefore a failure in function, such as burning, is likely to occur. In order to deal with such problems, the capillary seal portion in the disk drive device 100 is made long by thinning the flange 26e. As a result, the amount of the lubricant 28 that can be held becomes large, and accordingly the disk drive device 100 can be structured such that the lubricant 28 is hardly lacking even if dispersed due to an impact. That is, the distance in the axial direction of the thrust member 26 is designed to be long with respect to the hanging member 26c and to be short with respect to the flange 26e.

There is a method in which the outer circumferential surface of the hanging member 26c is fixed to the inner circumferential surface of the first cylinder portion 20b by press-fitting; however, there is the fear that, when the hanging member 26c receives stress due to press-fitting, a deformation may occur in the inner circumferential surface of the hanging member 26c, thereby functions of the capillary seal portion may be impaired. In order to deal with this, the outer circumferential surface of the hanging member 26c is made small in diameter than the inner circumferential surface of the first cylinder portion 20b and both are fixed together by adhesion, as stated above. As a result, a deformation in the hanging member 26c is prevented and the functions of the capillary seal portion can be sufficiently exhibited.

The magnet 24 is provided so as to face the outer circumference of the stator core 12 via narrow gap by being fixed to the inner circumference of the second cylinder portion 20c. The magnet 24 is formed of an Nd—Fe—B (Neodymium-Ferrum-Boron) material. Electro-deposition coating or spray coating is performed on the surface of the magnet 24, and the inner circumference thereof is magnetized with twelve poles.

Summarizing the aforementioned descriptions, the shaft 22 of the rotating body R is inserted into the cylinder portion inner circumferential surface 16a of the fixed body S, and the rotating body R is rotatably supported by the fixed body S via a radial dynamic pressure bearing RB and a thrust dynamic pressure bearing SB, which will be described later. A magnetic circuit comprises the hub 20, the stator core 12, and the magnet 24. Each coil 18 is sequentially powered by an external control and the rotating body R is rotatably driven and receives a floating force, thereby allowing for the rotating body R to float and rotate in a non-contact state with surrounding members.

Subsequently, a dynamic pressure bearing in the structure of the disk drive device 100 will be described. A radial dynamic pressure bearing includes the radial dynamic pressure generating portion, which is structured to include the outer circumferential surface 22c of the shaft 22, the cylinder portion inner circumferential surface 16a of the sleeve 16, and the lubricant 28, such as oil, etc., which is injected into the gap between the two. As the radial dynamic pressure generating portion, a first radial dynamic pressure bearing RB1 is arranged on the side remote from the hub 20 and a second radial dynamic pressure bearing RB2 is arranged on the side close thereto, the radial dynamic pressure grooves RB1 and RB2 being spaced apart from each other in the axial direction. The first radial dynamic pressure bearing RB1 and the second radial dynamic pressure bearing RB2 are provided in the gap between the cylinder portion inner circumferential surface 16a and the outer circumferential surface 22c such that radial dynamic pressure is generated to support the rotating body R. In the first radial dynamic pressure bearing unit RB1 and the second dynamic pressure bearing unit RB2, a first radial dynamic pressure groove and a second radial dynamic pressure groove, which generate dynamic pressure, are respectively formed on at least one of the outer circumferential surface 22c and the cylinder portion inner circumferential surface 16a, the surfaces 22c and 16a facing each other. These dynamic pressure grooves are formed to be, for example, herringbom-shaped.

When the rotating body R is rotating, the radial dynamic pressure groove generates radial dynamic pressure and the shaft 22 is supported by the radial dynamic pressure with a predetermined gap in the radial direction relative to the sleeve 16. Herein, the formation width in the axial direction of the first radial dynamic pressure groove in the first radial dynamic pressure bearing RB1 is formed to be narrower than that in the axial direction of the second radial dynamic pressure groove in the second radial dynamic pressure bearing RB2. Thereby, the radial dynamic pressure, corresponding to the side pressure with strength different in the axial direction of the shaft 22, is generated in the first radial dynamic pressure bearing RB1 and the second radial dynamic pressure bearing RB2. By generating such dynamic pressure, optimal balance between high shaft stiffness and low shaft loss can be obtained.

On the other hand, a thrust dynamic pressure bearing includes the first thrust dynamic pressure bearing SB1 and the second thrust dynamic pressure bearing SB2, as illustrated in FIG. 3. Herein, the first thrust dynamic pressure bearing SB1, i.e., the first thrust dynamic pressure generating portion, is formed by the thrust lower surface 26b of the flange 26e, the upper end portion of the housing 14, and the lubricant 28 injected into the gap in the axial direction between the two. The second thrust dynamic pressure bearing SB2, i.e., the second thrust dynamic pressure generating portion, is formed by the thrust upper surface 26a of the flange 26e, the lower surface of the circumferentially-extending portion 16b, and the lubricant 28 injected into the gap in the axial direction between the two.

A thrust dynamic pressure groove (not illustrated) for generating dynamic pressure is formed on at least one of the surfaces in the axial direction of the gap, the surfaces facing each other. The thrust dynamic pressure groove is formed to be, for example, spiral-shaped or herringbom-shaped. With the rotation of the rotating body R, the thrust dynamic pressure bearing SB generates the dynamic pressure in the pump-in direction as a whole and makes a force in the axial direction, i.e., a floating force act on the rotating body R with the pressure. The lubricant 28, injected into the gaps in the first radial dynamic pressure bearing RB1, the second radial dynamic pressure bearing RB2, the first thrust dynamic pressure bearing SB1, and the second thrust dynamic pressure bearing SB2, are commonly used among these gaps and is sealed by the capillary seal portion TS to prevent a leak thereof.

The capillary seal portion TS comprises the outer circumferential surface 14e of the housing 14 and the inner circumferential surface 26d of the thrust member 26. The outer circumferential surface 14e is tapered so as to be reduced in diameter going from the upper surface side toward the lower surface side. On the other hand, the inner circumferential surface 26d, which faces the outer circumferential surface 14e, is also tapered so as to be reduced in diameter going from the upper surface side toward the lower surface side, although its tilt angle is smaller than that of the outer circumferential surface 14e.

With such a structure, the capillary seal portion TS is formed by the outer circumferential surface 14e and the inner circumferential surface 26d, in which the gap between the two expands going from the upper surface side toward the lower surface side. Herein, the injection amount of the lubricant 28 is set such that the boundary surface (liquid surface) between the lubricant 28 and ambient air is located in the middle of the capillary seal portion TS, and therefore the lubricant 28 is sealed by the capillary seal portion TS by capillarity. As a result, a leak of the lubricant 28 can be prevented. That is, the lubricant 28 is to be injected into the lubricant holding portion including the first radial dynamic pressure bearing RB1, the second radial dynamic pressure bearing RB2, the first thrust dynamic pressure bearing SB1, and the second thrust dynamic pressure bearing SB2, and further including the spaces between the housing 14 and the thrust member 26 and between the circumferentially-extending portion 16b and the hub 20, etc.

As stated above, the capillary seal portion TS is designed such that the inner circumferential surfaces 26d, which is the outside tilted surface, is reduced in diameter going from the upper surface side toward the lower surface side. Accordingly, with the rotation of the rotating body R, a centrifugal force acts on the lubricant 28 in the direction where the lubricant 28 is made to move toward the inside of the space into which the lubricant 28 is injected, and therefore a leak of the lubricant 28 can be more surely prevented. Further, the communication channel I can be secured by the groove 14a formed in the axial direction on the inner circumferential surface of the housing 14. Because both sides of the first radial dynamic pressure bearing RB1 and the second radial dynamic pressure bearing RB2 are communicated by the communication channel I, the total pressure balance can be sufficiently maintained even if the pressure balance in a single radial dynamic pressure bearing breaks down. Further, if the dynamic pressure balance in each of the first radial dynamic pressure bearing RB1, the second radial dynamic pressure bearing RB2, and the thrust dynamic pressure bearing SB breaks down due to a disturbance, such as application of an external force on the shaft 22 or the rotating body R, etc., the pressures are instantly averaged and the balance can be maintained. As a result, the floating amount of the rotating body R is stabilized relative to the fixed body S, allowing for a disk drive device 100 with high reliability to be obtained.

Figure 4A:
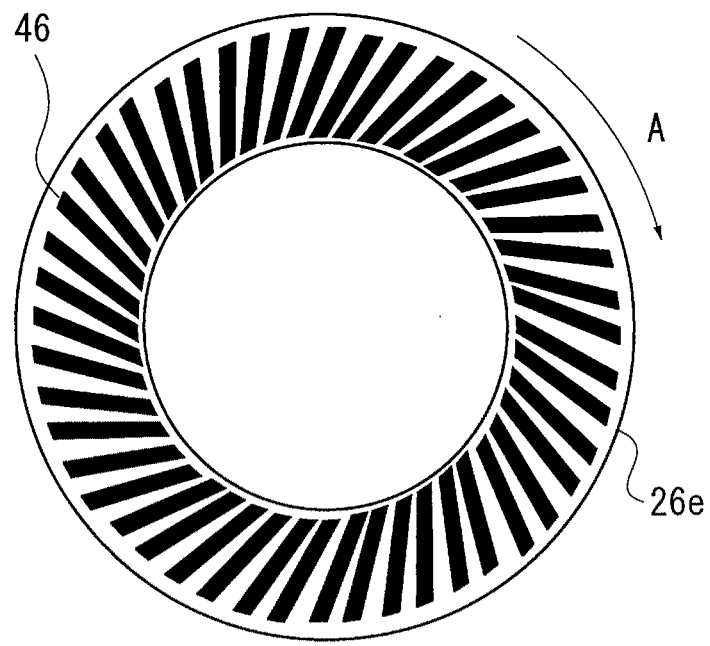
FIG. 4A is a plan view of thrust dynamic pressure grooves in the thrust dynamic pressure generating portion illustrated in FIG. 3, specifically illustrating first thrust dynamic pressure grooves in the first thrust dynamic pressure generating portion.

With reference to FIG. 3, the first thrust dynamic pressure generating portion and the second thrust dynamic pressure generating portion will be described in detail. As stated above, the first thrust dynamic pressure generating portion comprises the thrust lower surface 26b of the flange 26e, the housing flat portion 14d of the housing 14, and the lubricant 28 injected between the two. In the case of the example of FIG. 3, a first thrust dynamic pressure groove 46 with which the first thrust dynamic pressure generating portion is structured is formed on the thrust lower surface 26b of the flange 26e, making the housing flat portion 14d facing the first thrust dynamic pressure groove 46, a first facing surface. As illustrated in FIG. 4A, the first thrust dynamic pressure groove 46 is formed to have a posture in which the depth direction thereof faces to a first axial direction relative to the axial direction of the rotating body R (upward posture in FIG. 3). And, when the flange 26e is rotating in the arrow A direction in FIG. 4A with the rotation of the rotating body R, the first thrust dynamic pressure groove 46 generates the dynamic pressure in the pump-in direction that is oriented from the capillary seal portion TS, located on the open end portion side of the lubricant holding portion in which the lubricant 28 is held, toward the inside of the lubricant holding portion. That is, the first thrust dynamic pressure groove 46 functions as a first pump-in groove portion.

Figure 4B:
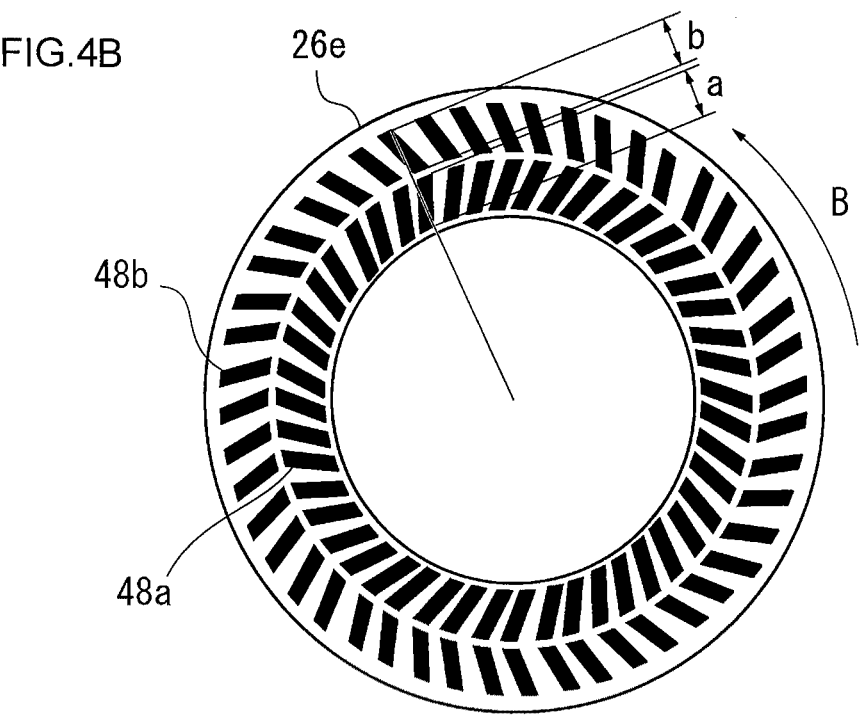
FIG. 4B is a plan view of thrust dynamic pressure grooves in the thrust dynamic pressure generating portion illustrated in FIG. 3, specifically illustrating second thrust dynamic pressure grooves in the second thrust dynamic pressure generating portion when dynamic pressure becomes neutral.

On the other hand, the second thrust dynamic pressure generating portion comprises the thrust upper surface 26a of the flange 26e, the lower surface of the circumferentially-extending portion 16b of the sleeve 16, and the lubricant 28 injected between the two. In the case of the example of FIG. 3, a second thrust dynamic pressure groove 48a and a second thrust dynamic pressure groove 48b with which the second thrust dynamic pressure generating portion is structured are formed on the thrust upper surface 26a of the flange 26e, making the lower surface of the circumferentially-extending portion 16b facing the second thrust dynamic pressure grooves 48a and 48b, a second facing surface. As illustrated in FIG. 4B, the second thrust dynamic pressure grooves 48a and 48b are formed to have a posture in which the depth direction thereof faces to a second axial direction (downward posture in FIG. 3), opposite to the first axial direction. The second thrust dynamic pressure groove 48a is arranged concentrically with the rotational center of the hub 20, and functions as a second pump-in groove portion for generating the dynamic pressure in the pump-in direction when the flange 26e is rotating in the arrow B direction in FIG. 4B with the rotation of the rotating body R. The second thrust dynamic pressure groove 48b is arranged nearer to the outer circumference than the second thrust dynamic pressure groove 48a and arranged concentrically with the rotational center, and functions as a pump-out groove portion that generates the dynamic pressure in the pump-out direction, opposite to the pump-in direction. The first thrust dynamic pressure groove 46 and the second thrust dynamic pressure grooves 48a and 48b may be formed, for example, to be spiral-shaped.

In the case of a fluid dynamic bearing unit, combined dynamic pressure obtained by combining the thrust dynamic pressure and the aforementioned radial dynamic pressure, both of which are generated by the rotation of the rotating body R, is designed to act in the pump-in direction as a whole. With the dynamic pressure acting on the lubricant 28 in a fluid dynamic bearing unit in the pump-in direction as a whole, the hub 20 receives a force in the direction where the shaft 22 is to come off the sleeve 16, i.e., a floating force. The hub 20 is stabilized at the position in the axial direction where a force to attract the hub generated by the action of the aforementioned attracting plate 44, a force to float the hub, and the gravity applied to the rotating body are balanced, thereby determining the position in the axial direction of the recording disk 120. In other words, when the hub 20 is displaced in the floating direction, the gap in the first thrust dynamic pressure bearing SB1 will expand, causing a pump-in force to be decreased. With this, a force to float the hub is decreased. On the other hand, a force to attract the hub and the gravity applied to the rotating body are approximately constant with respect to a displacement in the axial direction without great changes. Accordingly, a floating posture of the hub 20 is stabilized at the position where a force to attract the hub, a force to float the hub, and the gravity applied to the rotating body becomes equal.

Herein, the relationship between a force to attract the hub and a displacement in the thrust direction of the hub 20 will be described. The issues with respect to the relationship between the two, which the present inventors have recognized, will be at first described. In the structure illustrated in FIG. 3, the case where the formation widths of the second thrust dynamic pressure grooves 48a and 48b are substantially equal to each other as illustrated in FIG. 4B. In this case, because the respective gap distances between the second thrust dynamic pressure grooves 48a and 48b and the lower surface of the circumferentially-extending portion 16b facing the second thrust dynamic pressure grooves 48a and 48b, are equal as illustrated in FIG. 3, the dynamic pressure in the pump-in direction in the second thrust dynamic pressure groove 48a and that in the pump-out direction in the second thrust dynamic pressure groove 48b become equal to each other, creating a neutral state. In this structure, when the dynamic pressure in the pump-in direction, generated by the first thrust dynamic pressure groove 46 due to the rotation of the rotating body R, becomes large and accordingly the pump-in dynamic pressure in the whole fluid dynamic bearing unit becomes large, a force to float the hub is increased, thereby causing the hub 20 to be displaced in the direction where the hub 20 may come off the sleeve 16. At the time, when the hub 20 is displaced in the direction where the hub 20 may come off, the space where the pump-in dynamic pressure is being generated expands and the dynamic pressure is decreased. That is, a force to float the hub is decreased. And then, the hub 20 is stabilized at the position where the aforementioned three forces of the force to attract the hub, the force to float the hub, and the gravity applied to the rotating body are balanced.

Figure 5:
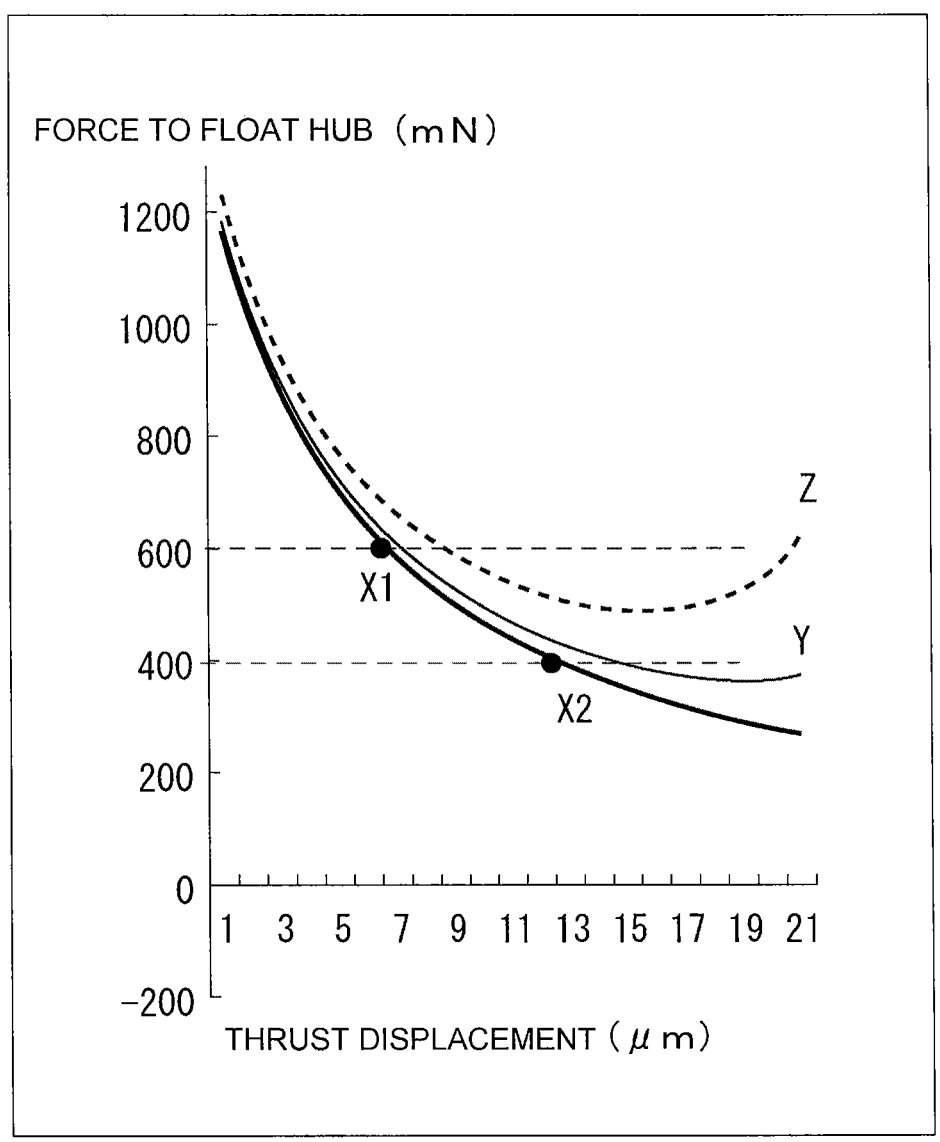
FIG. 5 is an illustrative graph illustrating the relationship between a thrust displacement amount and a force to float a hub in the disk drive device in which the dynamic pressure grooves illustrated in FIG. 4A or 4B are applied to the thrust dynamic pressure generating portion illustrated in FIG. 3.

FIG. 5 is a graph illustrating, in the fluid dynamic bearing unit in which the forces are balanced as stated above, the relationship between a displacement amount in the floating direction (hereinafter, referred to as a thrust displacement) of the hub 20 and a force to float the hub by the pump-in dynamic pressure. In this structure, the sum of a force to attract the hub that is generated by the interaction between the attracting plate 44 and the magnet 24 and the gravity applied to the rotating body is set to, for example, 600 mN. In the range of a thrust displacement illustrated in FIG. 5, even when the hub 20 is transferred, the gravity applied to the rotating body is constant and a change in the force to attract the hub is negligibly small and therefore the force to attract the hub is assumed to be approximately constant. In this example, the hub 20 is stabilized during the rotation of the rotating body R, in which the thrust displacement when the force to float the hub is 600 mN is balanced at a stabilization point X1. The stiffness in the thrust direction (hereinafter, simply referred to as the stiffness) of the hub 20 at the stabilization point X1 can be represented by the tilt at this stabilization point, which is approximately 56 mN/μm. That is, it is meant that, if stress of 56 mN is generated in the hub 20 when a vibration acceleration is applied to, for example, a mobile device in which the disk drive device 100 is mounted, or to the disk drive device 100 itself due to an impact, etc., a thrust displacement of 1 μm occurs in the recording disk 120.

If the stiffness is small, a thrust displacement of the recording disk 120, corresponding to the stress due to a vibration acceleration, becomes large. If a thrust displacement of the recording disk 120 becomes large, the relative distance between the magnetic head and the recording disk 120 becomes unstable, thereby causing an increase in errors in reading/writing data. From experiments, etc., the present inventors have found that, in a mobile device frequently used in an environment with a lot of vibrations, the error rate in reading/writing data with respect to vibrations can be maintained to the extent that is practically acceptable when the stiffness is greater than or equal to 40 mN/μm.

On the other hand, disk drive devices 100 to be mounted in mobile devices are demanded so that drive currents are reduced as stated above. In response to the demand, reduction in a drive current can be realized by reducing a force to float the hub in the structure illustrated in FIGS. 2 and 3. In this case, the sum of a force to attract the hub and the gravity applied to the rotating body can be set to, for example, 400 mN. When the sum of a force to attract the hub and the gravity applied to the rotating body is set to 400 mN in the structure illustrated in FIG. 3, a stabilization point is transferred to X2 point in the graph of FIG. 5, so that the forces are balanced. The stiffness in this case is decreased to approximately 25 mN/μm. Accordingly, the stiffness becomes smaller than the aforementioned stiffness necessary for mobile devices, thereby causing the disadvantage that the error rate in reading/writing data may be increased with respect to vibrations.

Also, in the case where the dynamic pressure in the pump-in direction in the second thrust dynamic pressure groove 48a and that in the pump-out direction in the second thrust dynamic pressure groove 48b are set to be equal so that the total of the two is neutral, variations on the processed surfaces of the dynamic pressure grooves or the circumferentially-extending portion 16b may possibly occur. In this case, a state sometimes occur, in which the dynamic pressure in the pump-in direction generated by the second thrust dynamic pressure groove 48a is larger than that in the pump-out direction generated by the second thrust dynamic pressure groove 48b (hereinafter, referred to as pump-in rich). For example, when the dynamic pressure becomes 12% pump-in rich due to a variation in processing, the relationship between a thrust displacement and a force to float the hub has the characteristic represented by the curved line Y in FIG. 5. In this case, when the sum of the force to attract the hub and the gravity applied to the rotating body is 400 mN, the stiffness is decreased to 15 mN/μm. Further, when the dynamic pressure becomes 20% pump-in rich due to a variation in processing, the relationship between a thrust displacement and a force to float the hub has the characteristic represented by the curved line Z in FIG. 5. In this case, when the sum of the force to attract the hub and the gravity applied to the rotating body is 400 mN, a stabilization point is not present. If a stabilization point is not present, the gap in the first dynamic pressure bearing SB1 will expand until the gap in the second thrust dynamic pressure bearing SB2 is not present. The fact that the gap in a fluid dynamic bearing is not present means that the lower surface of the circumferentially-extending portion 16b on the stator side and the thrust upper surface 26a on the rotating body side are in contact with each other. In this case, an increase in a drive current due to an increase in the contact load, a decrease in the lifetime due to the wear, a great deterioration in the error rate in reading/writing data due to deterioration in the rotational accuracy because of the contact, etc., may occur.

So, in the present embodiment, it is designed that, even if a force to attract the hub is reduced, the necessary stiffness can be secured and the position in the thrust direction of the hub 20 can be stabilized by aggressively suppressing occurrence of a pump-in rich state.

Specifically, the dynamic pressure generation characteristics of the first thrust dynamic pressure groove 46 forming the first thrust dynamic pressure generating portion and the second thrust dynamic pressure grooves 48a and 48b forming the second thrust dynamic pressure generating portion are adjusted. That is, those thrust dynamic pressure grooves 46, 48a, and 48b are structured to have the dynamic pressure generation characteristic in which, when the rotating body R is biased in the rotational axis direction from the state of floating in the lubricant 48, the sum of the changes in the dynamic pressure in the pump-out direction is larger than that in the changes in the dynamic pressure in the pump-in direction.

Figure 6:
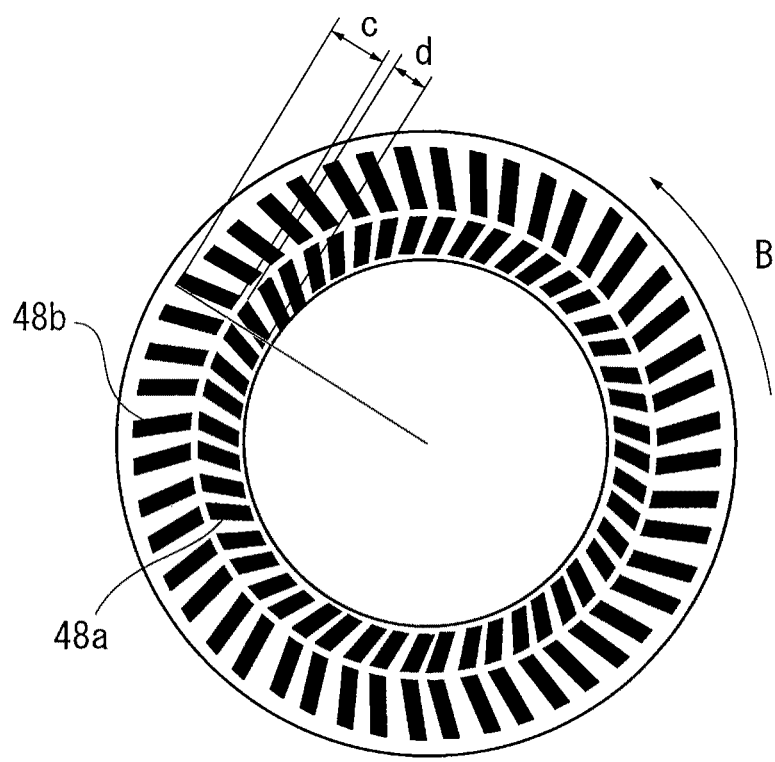
FIG. 6 is an illustrative view illustrating the structure of a dynamic pressure groove to be applied to the thrust dynamic pressure generating portion in FIG. 3, in the disk drive device according to the present embodiment.

For example, as illustrated in FIG. 6, the formation width c in the radial direction of the pump-out groove portion in the second thrust dynamic pressure groove 48b generating the dynamic pressure in the pump-out direction, the radial direction being perpendicular to the circumferential direction of the pump-out groove portion in the second thrust dynamic pressure groove 48b, is made large than the formation width d of the pump-in groove portion in the second thrust dynamic pressure groove 48a. When the gap distance between the thrust dynamic pressure groove and the lower surface of the circumferentially-extending portion 16b is equal, the dynamic pressure generated in the thrust dynamic pressure groove is approximately proportional to the formation width of the thrust dynamic pressure groove. That is, when the hub 20 is biased, for example, upwards in the axial direction, both gap distances between the second thrust dynamic pressure grooves 48a and 48b and the lower surface of the circumferentially-extending portion 16b, become narrow. However, because the formation width of the second thrust dynamic pressure groove 48b is larger than that of the second thrust dynamic pressure groove 48a, the change in the dynamic pressure in the pump-out direction, corresponding to the change in the gap distance, becomes larger than that in the dynamic pressure in the pump-in direction. That is, in the second thrust dynamic pressure grooves 48a and 48b, a "pump-out rich" state is created in which the dynamic pressure in the pump-out direction is larger than that in the pump-in direction. By adjusting the formation width c of the pump-out groove portion and the formation width d of the pump-in groove portion, for example, a 40%-pump-out rich state can be created. The gap distance between the first thrust dynamic pressure groove 46 and the housing flat portion 14d expands due to the flotation of the hub 20, and therefore the dynamic pressure in the pump-in direction is decreased. As a result, in the dynamic pressure as the whole fluid dynamic bearing unit, the force to float the hub occurring when the hub 20 is to be biased is suppressed, and accordingly a thrust displacement becomes small.

Figure 7:
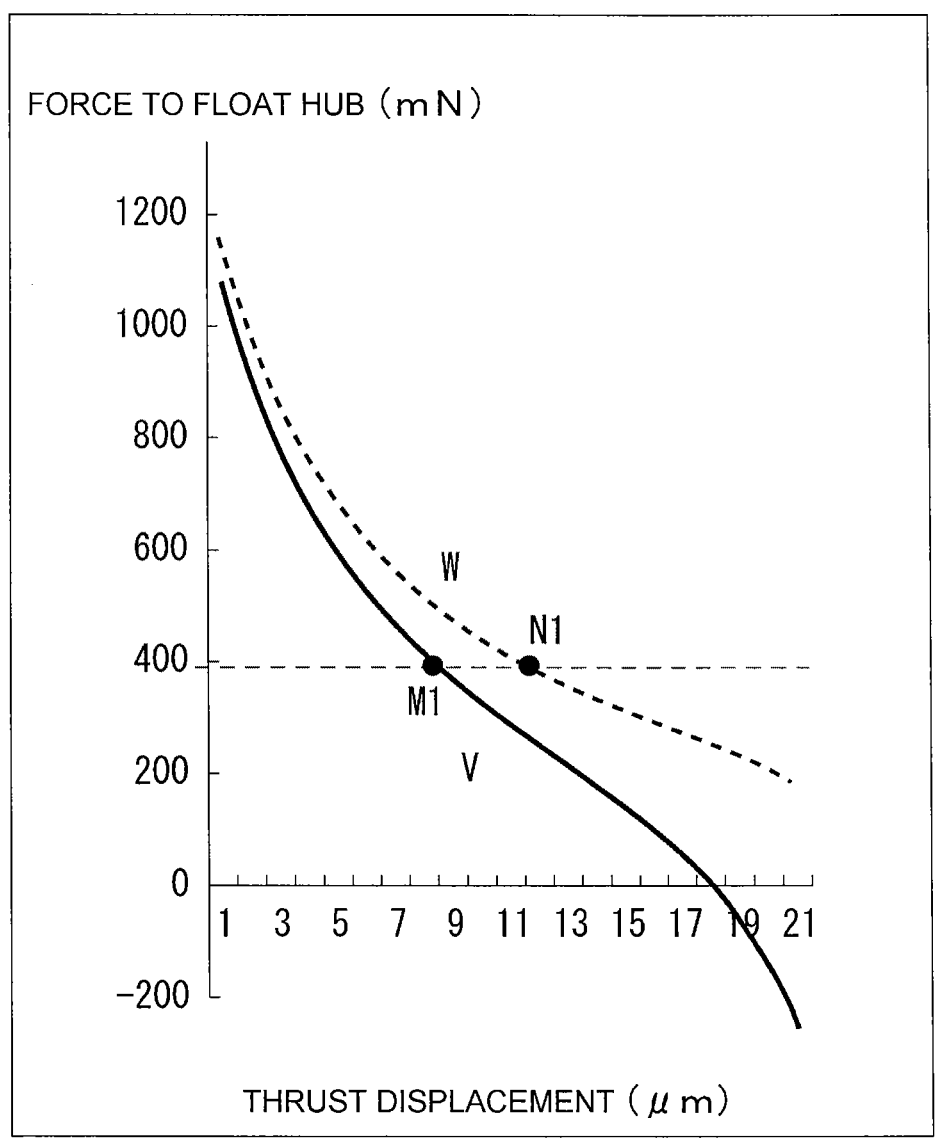
FIG. 7 is an illustrative graph illustrating the relationship between a thrust displacement amount and the force to float the hub in the disk drive device to which the dynamic pressure groove illustrated in FIG. 6 is applied.

FIG. 7 is an illustrative graph illustrating the relationship between the force to float the hub of the hub 20 and the thrust displacement when a "pump-out rich" state is created by adjusting the dynamic pressure generation characteristics of the second thrust dynamic pressure grooves 48a and 48b, as stated above. When the rotating body R is rotating, the dynamic pressure in the pump-in direction is generated by the first thrust dynamic pressure groove 46, and therefore the dynamic pressure in the pump-in direction is generated as the whole fluid dynamic bearing unit, although a pump-out rich state is being created on the second thrust dynamic pressure grooves 48a and 48b side; and accordingly, the hub 20 floats. In FIG. 7, when a pump-out rich state is created by adjusting the dynamic pressure generation characteristics of the second thrust dynamic pressure grooves 48a and 48b, the forces are balanced at M1 point in the curved line V in FIG. 7, even when the sum of the force to attract the hub and the gravity applied to the rotating body is set to 400 mN, thereby making M1 point a stabilization point. In this case, the stiffness is approximately 45 mN/μm, which is larger than the stiffness necessary in the case where a disk drive device 100 is mounted in a mobile device, accordingly making the error rate in reading/writing data with respect to vibrations practically acceptable.

The present inventors have acquired an experimental result that a 20%-pump-out rich state can be secured even when taking into consideration a variation in the processing of the second thrust dynamic pressure grooves 48a and 48b, and a pump-in rich state is not created on the second thrust dynamic pressure grooves 48a and 48b side. Even in a 20%-pump-out rich state, the relationship between a thrust displacement and a force to float the hub has the characteristic represented by the curved line W in FIG. 7, in which N1 point becomes a stabilization point when the force to float the hub is 400 mN and a stabilization point is never absent.

The case where a mobile device in which the disk drive device 100 including the fluid dynamic bearing unit structured as stated above is mounted has received a vibration or an impact, will be described.

For example, the case where a mobile device has received an impact from the lower surface side of the base member 10 in the disk drive device 100, which is being rotationally driven, will be taken into consideration. In this case, the rotating body R including the hub 20 is biased upwards by the impact. As a result, generated dynamic pressure becomes large because the relative gap between the second thrust dynamic pressure grooves 48a and 48b and the circumferentially-extending portion 16b becomes narrow. In this case, because the dynamic pressure in the pump-out direction generated by the second thrust dynamic pressure groove 48b becomes larger than that in the pump-in direction generated by the second thrust dynamic pressure groove 48a, the floatation of the hub 20 is suppressed. When the hub 20 falls down, the gap distance between the first thrust dynamic pressure groove 46 and the housing flat portion 14d becomes narrow this time, and thereby the dynamic pressure in the pump-in direction, generated by the first thrust dynamic pressure groove 46, becomes large. With this movement being repeated, an amount of a bias occurring due to an impact applied from outside is attenuated, and the hub 20 can be quickly left motionless at a stabilization position. That is, a high stiffness state in which the hub is hardly biased can be realized by adjusting the dynamic pressure generation characteristics of the second thrust dynamic pressure grooves 48a and 48b. In other words, a decreased stiffness due to a reduction in a current drive can be covered by adjusting the dynamic pressure generation characteristics of the second thrust dynamic pressure grooves 48a and 48b.

It is also the same as the case where a disk drive device 100, which is being rotationally driven, has received an impact from the upper surface side of the hub 20 in the disk drive device 100. The rotating body including the hub 20 is at first biased downwards due to an impact. As a result, the gap distance between the first thrust dynamic pressure groove 46 and the housing flat portion 14d becomes narrow, and therefore the dynamic pressure in the pump-in direction in the first thrust dynamic pressure groove 46 is increased, thereby the hub 20 receiving a strong floating force. As a result, the generated dynamic pressure becomes large because the relative gap between the second thrust dynamic pressure grooves 48a and 48b and the circumferentially-extending portion 16b becomes narrow. In this case, because the dynamic pressure in the pump-out direction generated by the second thrust dynamic pressure groove 48b becomes larger than that in the pump-in direction generated by the second thrust dynamic pressure groove 48a, the floatation of the hub 20 is suppressed. Accordingly, the hub 20 falls down. Following that, dynamic pressure acts so as to quickly leave the hub 20 motionless at a stabilization position in the same way as the aforementioned case.

Figure 8:
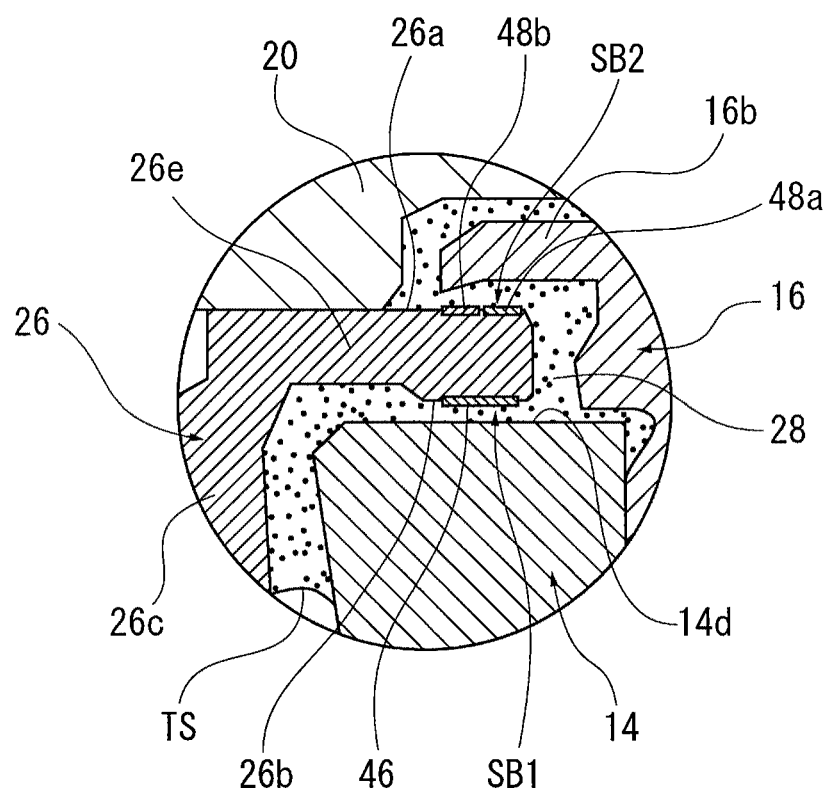
FIG. 8 is an enlarged view of the second thrust dynamic pressure generating portion with another structure in the disk drive device according to the present embodiment.

FIG. 8 is an illustrative view illustrating another structure in which the dynamic pressure generation characteristics of the second thrust dynamic pressure grooves 48a and 48b are adjusted. Also, in this structure, the dynamic pressure generated in the second thrust dynamic pressure generating portion, which comprises the second thrust dynamic pressure grooves 48a and 48b, the circumferentially-extending portion 16b, and the lubricant 28, is made pump-out rich. Although the basic structure is the same as the structure in FIG. 3, the gap distance between the pump-out groove portion, which is the second thrust dynamic pressure groove 48b, and the circumferentially-extending portion 16b facing the pump-out groove portion, is reduced outwards in the radial direction of the sleeve 16. In the example of FIG. 8, a taper is formed. That is, the gap distance between the second thrust dynamic pressure groove 48b and the lower surface of the circumferentially-extending portion 16b is smaller than that between the second thrust dynamic pressure groove 48a and the lower surface of the circumferentially-extending portion 16b. As stated above, as the distance between a dynamic pressure groove and the surface facing the dynamic pressure groove is smaller, generated dynamic pressure is larger. As a result, the dynamic pressure in the pump-out direction generated in the second thrust dynamic pressure groove 48b becomes larger than that in the pump-in direction generated in the second thrust dynamic pressure groove 48a. That is, when the rotating body R is rotating, a pump-out rich state is created in the second thrust dynamic pressure generating portion. In this case, the formation widths of the second thrust dynamic pressure grooves 48a and 48b may be almost the same with each other, as illustrated in FIG. 4B. As another example, the formation width of the second thrust dynamic pressure groove 48b may be adjusted such that a ratio in which a pump-out rich state is created is increased by making the formation width thereof larger than that of the second thrust dynamic pressure groove 48a, as well as reducing the gap distance between the second thrust dynamic pressure groove 48b and the circumferentially-extending portion 16b facing the dynamic pressure groove 48b, outwards in the radial direction of the sleeve 16.

Figure 9:
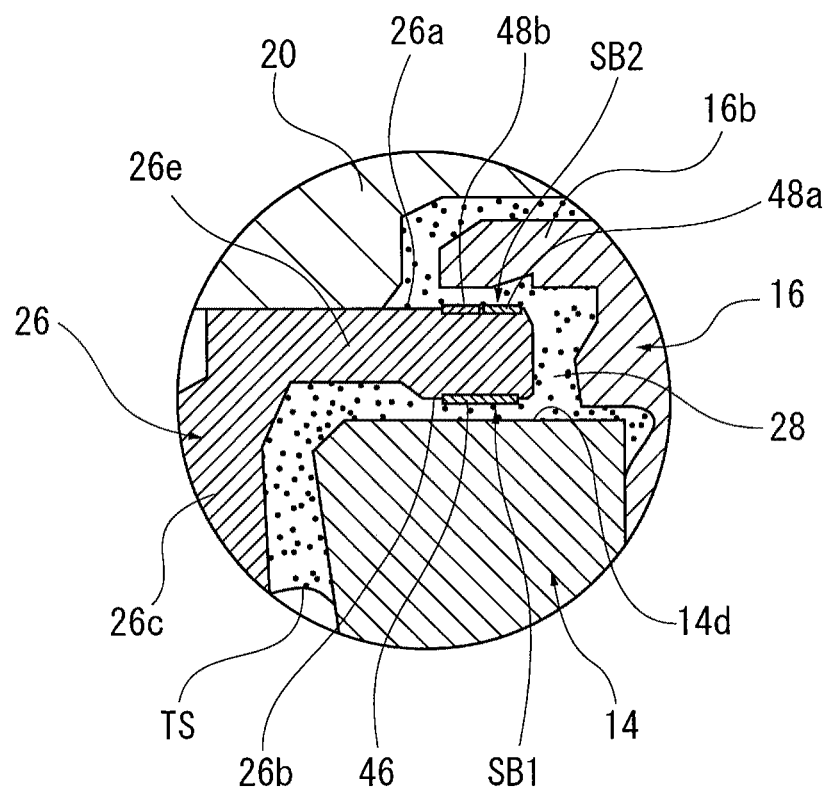
FIG. 9 is an enlarged view of the second thrust dynamic pressure generating portion including the second thrust dynamic pressure groove with another structure in the disk drive device according to the present embodiment.

FIG. 9 is also an illustrative view illustrating another structure in which the dynamic pressure generation characteristics, generated by the second thrust dynamic pressure grooves 48a and 48b, are adjusted. Although FIG. 9 is alike to FIG. 8, the gap distance between the pump-in groove portion, which is the second thrust dynamic pressure groove 48a, and the circumferentially-extending portion 16b facing the dynamic pressure groove 48a is increased inwards in the radial direction of the sleeve 16. In the example of FIG. 9, a taper is formed. That is, the gap distance between the second thrust dynamic pressure groove 48a and the lower surface of circumferentially-extending portion 16b is made larger than that between the second thrust dynamic pressure groove 48b and the lower surface of the circumferentially-extending portion 16b. As a result, the dynamic pressure in the pump-in direction generated in the second thrust dynamic pressure groove 48a becomes smaller than that in the pump-out direction generated in the second thrust dynamic pressure groove 48b. That is, the dynamic pressure in the pump-out direction generated in the second thrust dynamic pressure groove 48b becomes larger than that in the pump-in direction generated in the second thrust dynamic pressure groove 48a. As a result, when the rotating body R is rotating, a pump-out rich state is created in the second thrust dynamic pressure generating portion. Also, in this case, the formation widths of the second thrust dynamic pressure grooves 48a and 48b may be almost the same with each other, as illustrated in FIG. 4B. As another example, the formation width of the second thrust dynamic pressure groove 48b may be adjusted such that a ratio in which a pump-out rich state is created is increased by making the formation width thereof larger than that of the second thrust dynamic pressure groove 48a, as well as expanding the gap distance between the second thrust dynamic pressure groove 48*a* and the circumferentially-extending portion 16*b* facing the dynamic pressure groove 48*a*, inwards in the radial direction of the sleeve 16.

Figure 10:
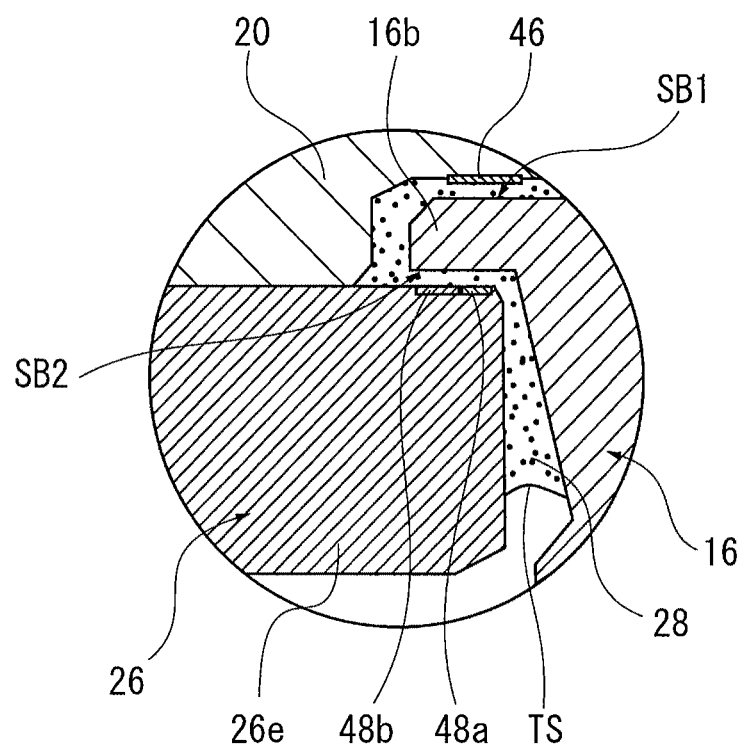
FIG. 10 is an enlarged view illustrating another example of the first thrust dynamic pressure generating portion and the second thrust dynamic pressure generating portion in the disk drive device according to the present embodiment.

In FIGS. 9 and 10, examples in which tapers are formed in order to adjust the gap distances have been illustrated; however, it is sufficient that only the adjustment of the gap distance can be performed. And accordingly, for example, a curved shape or a step-like shape may be adopted, which can provide a similar effect.

FIG. 10 is an illustrative view illustrating another structure in which the dynamic pressure generation characteristics, generated by the second thrust dynamic pressure grooves 48*a* and 48*b*, are adjusted. In the case of the structure of FIG. 10, the housing 14 illustrated in FIG. 9, etc., is integrated with sleeve 16. The first thrust dynamic pressure generating portion comprises the upper surface of the sleeve 16, the lower surface of the hub 20, and the lubricant 28; and the first thrust dynamic pressure groove 46 is provided on the lower surface of the hub 20. The second thrust dynamic pressure generating portion comprises the lower surface of the sleeve 16, the upper surface of the flange 26*e* in the thrust member 26, and the lubricant 28; and the second thrust dynamic pressure grooves 48*a* and 48*b* are provided on the upper surface of the flange 26*e*. In the case of FIG. 10, the second thrust dynamic pressure groove 48*b* is concentrically formed on the outer circumference side of the second thrust dynamic pressure groove 48*a*. The formation width of the second thrust dynamic pressure groove 48*b* by which the dynamic pressure in the pump-out direction is generated is larger than that of the pump-in groove portion, which is the second thrust dynamic pressure groove 48*a*. The inner cylindrical surface of the thrust member 26 surrounds the outer cylindrical surface of the sleeve 16, and the gap formed by the two expands moving away from the circumferentially-extending portion 16*b* (toward the downside in the axial direction in FIG. 10), so that the capillary seal portion is formed.

When the hub 20 is rotating in a predetermined direction, the first thrust dynamic pressure groove 46 and the second thrust dynamic pressure groove 48*a* generate the dynamic pressure in the pump-in direction, and the second thrust dynamic pressure groove 48*b* generates the dynamic pressure in the pump-out direction. As stated above, because the formation width of the second thrust dynamic pressure groove 48*b* is made larger than that of the second thrust dynamic pressure groove 48*a*, when the hub 20 has been biased in the axial direction, the change in the dynamic pressure in the pump-out direction, corresponding to the bias, becomes larger than that in the dynamic pressure in the pump-in direction. As a result, similarly to the structure illustrated in FIG. 3, etc., a pump-out rich state is created in the second thrust dynamic pressure generating portion when the hub 20 has been biased, thereby suppressing an increase in the floating force of the hub 20. That is, the amount of a bias occurring due to an impact applied from outside is attenuated and the hub 20 is quickly left motionless at a stabilization point. That is, a high stiffness state in which the hub 20 is hardly biased can be realized by adjusting the dynamic pressure generation characteristics of the second thrust dynamic pressure grooves 48*a* and 48*b*. In other words, the decreased stiffness due to a reduction in a drive current can be covered by adjusting the dynamic pressure generation characteristics of the second thrust dynamic pressure grooves 48*a* and 48*b*.

Alternatively, the first thrust dynamic pressure groove 46 may be formed on the upper surface side of the circumferentially-extending portion 16*b*. In addition, the second thrust dynamic pressure grooves 48*a* and 48*b* may be formed on the lower surface side of the circumferentially-extending portion 16*b*, which can provide a similar effect.

Figure 11:
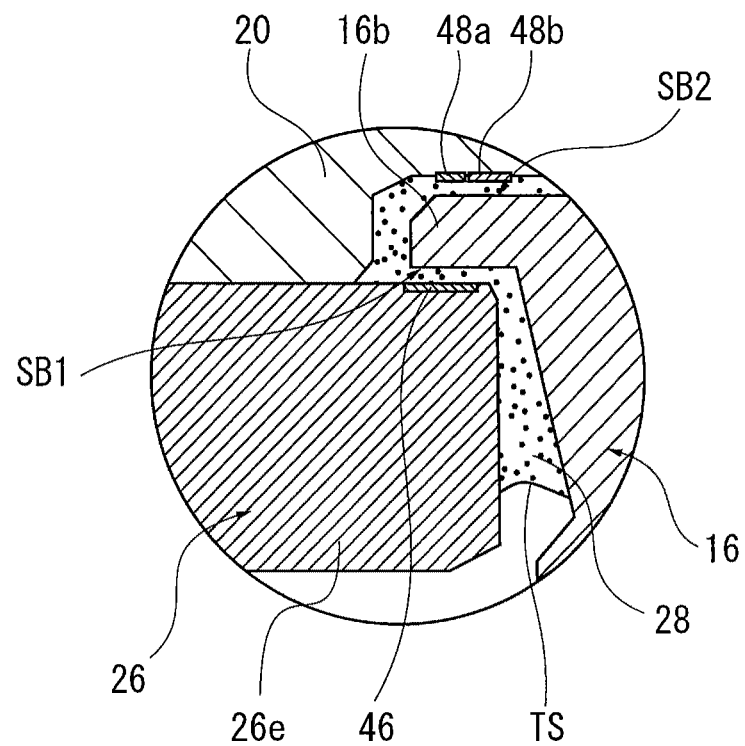
FIG. 11 is an enlarged view illustrating another example of the first thrust dynamic pressure generating portion and the second thrust dynamic pressure generating portion in the disk drive device according to the present embodiment.

FIG. 11 illustrates a variation of the structure of FIG. 10. In the case of the example of FIG. 11, the arrangement of the first thrust dynamic pressure generating portion and the second thrust dynamic pressure generating portion is opposite to that in the example of FIG. 10. That is, the first thrust dynamic pressure generating portion comprises the lower surface of the sleeve 16, the upper surface of the flange 26*e* in the thrust member 26, and the lubricant 28; and the first thrust dynamic pressure groove 46 is provided on the upper surface of the flange 26*e*. The second thrust dynamic pressure generating portion comprises the upper surface of the sleeve 16, the lower surface of the hub 20, and the lubricant 28; and the second thrust dynamic pressure grooves 48*a* and 48*b* are provided on the lower surface of the hub 20. In the case of FIG. 11, the second thrust dynamic pressure groove 48*a* is concentrically formed on the outer circumference side of the second thrust dynamic pressure groove 48*b*. In addition, the formation width of the second thrust dynamic pressure groove 48*b* by which the dynamic pressure in the pump-out direction is generated is larger than that of the pump-in groove in the second thrust dynamic pressure groove 48*a*. Even such an arrangement structure can provide a similar effect as in FIG. 10.

Alternatively, the first thrust dynamic pressure groove 46 may be formed on the lower surface side of the circumferentially-extending portion 16*b*. In addition, the second thrust dynamic pressure grooves 48*a* and 48*b* may be formed on the upper surface side of the circumferentially-extending portion 16*b*, which can provide a similar effect.

Figure 12:
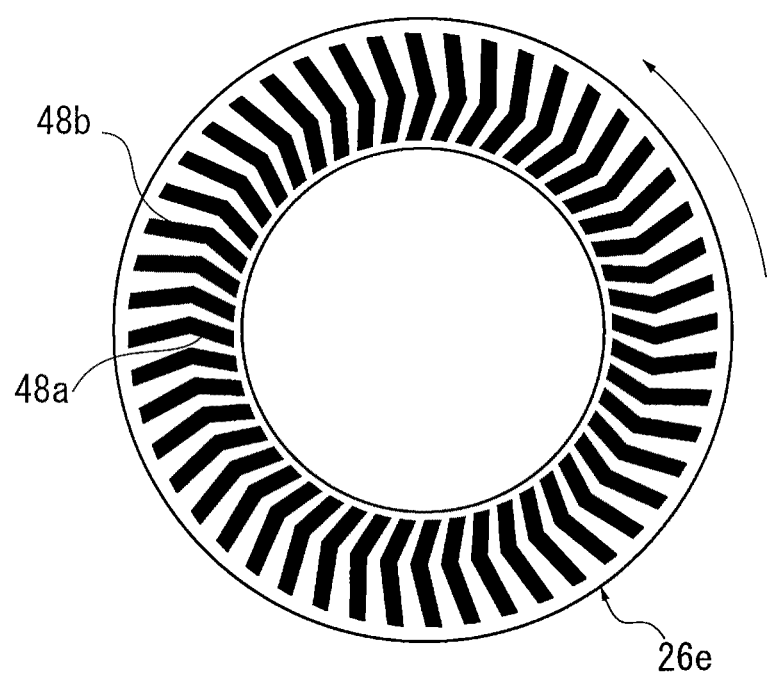
FIG. 12 is an illustrative view illustrating another structure of the second thrust dynamic pressure groove to be applied to the disk drive device according to the present embodiment.

FIG. 12 illustrates a variation of the second thrust dynamic pressure grooves 48*a* and 48*b* illustrated in FIG. 6. In the case of FIG. 6, the second thrust dynamic pressure grooves 48*a* and 48*b* are formed to be spaced apart from each other. Contrary to that, in the example of FIG. 12, the second thrust dynamic pressure grooves 48*a* and 48*b* are formed to be continuous with each other. That is, one end of the pump-in dynamic pressure groove is connected with one end of the pump-out dynamic pressure groove. When the second thrust dynamic pressure grooves 48*a* and 48*b* are formed to be continuous with each other, rolling processing in which continuous work can be performed in a single step can be adopted, which contributes to simplification or shortening of the manufacturing steps in the processing of dynamic pressure grooves. On the other hand, when the second thrust dynamic pressure grooves 48*a* and 48*b* are to be spaced apart from each other as illustrated in FIG. 6, the time for processing individual dynamic pressure grooves can be shortened, and therefore a processing load that is given to the flange 26*e* at processing can be reduced, thereby effectively preventing a deformation of the thin flange 26*e*. In addition, when the formation widths of the second thrust dynamic pressure grooves 48*a* and 48*b* are made equal to each other as illustrated in FIG. 4, both dynamic pressure grooves 48*a* and 48*b* may be connected with each other.

It is supposed that disk drive devices mounted in mobile devices are used in various postures. A disk drive device is supposed to be used while the recoding disk is rotating in a posture in which the recording disk faces, for example, upwards, sideways, or downwards relative to the base member. In this case, the rotating body receives the gravity, corresponding to the total mass including the recording disk. The gravity acts in the direction where the rotating body will approach the base member when the recording disk faces upwards, or where the rotating body will move away from the base member when the recording disk faces downwards. That is, the distance in the axial direction between the base member and the recording disk may change due to the change in the posture. If the change in the distance in the axial direction between the base member and the recording disk becomes large, the relative distance between the recording disk and the magnetic head becomes unstable, thereby causing the fear that an increase in errors in reading/writing data may be increased. From experiments, the present inventors have found that, when the change is smaller than or equal to 10 µm, errors in reading/writing data can be suppressed within a range that cannot be a significant problem in practical use.

Accordingly, in response to the experiment results, the present inventors have recognized that it is desirable to adjust the stiffness in the thrust direction. That is, in the state where the rotating body on which the recording disk is mounted is rotating, the change in the distance in the axial direction between the base member and the recording disk can be made smaller than or equal to 10 µm by adjusting the stiffness in the thrust direction according to the aforementioned present embodiment, in both postures in which the recording disk faces upwards relative to the base member and faces downwards relative thereto. It is more preferable that the change in the distance in the axial direction between the base member and the recording disk is made smaller than or equal to 7 µm. When the change in the axial direction becomes small, it is preferable in terms that an increase in errors in reading/writing data can be further suppressed. Further, it is preferable that the change in the axial direction between the base member and the recording disk is made smaller than or equal to 5 µm. In this case, there is an advantage in terms that an increase in errors in reading/writing data can be suppressed even when a disk drive device is used under an environment with large vibrations and impacts. In addition, the inventors have recognized that, as the change in the axial direction is made smaller when the rotating body is rotating, the drive current in the drive unit is on the trend of being increased. Accordingly, the inventors have acquired the following result: it is sufficient that the lower limit of the change in the distance in the axial direction between the base member and the recording disk is made to be greater than or equal to 2 µm in order for a drive current in the drive unit not to exceed a predetermined range. In this case, both an increase in a drive current and an increase in the change in the distance in the axial direction can be suppressed.

The thrust member 26 and the flange 26e can be formed and efficiently manufactured by pressing a metal material. The second thrust dynamic pressure grooves 48a and 48b may be formed in conjunction with the press processing of the flange 26e. In this case, manufacturing efficiency can be further improved. Alternatively, the thrust member 26 and the flange 26e may be formed of a resin material, such as a plastic material, etc. The second thrust dynamic pressure grooves 48a and 48b may be formed in conjunction with the resin molding of the flange 26e. In this case, both a reduction in weight of a disk drive device and the efficiency in manufacturing the disk drive devices can be improved.

The aforementioned positions where the first thrust dynamic pressure generating portion and the second thrust dynamic pressure generating portion are formed and the shape of each dynamic pressure groove are only one example. Accordingly, the positions where the first thrust dynamic pressure generating portion and the second thrust dynamic pressure generating portion are formed and the shape of each dynamic pressure groove may be appropriately changed so long as the first thrust dynamic pressure generating portion and the second thrust dynamic pressure generating portion have dynamic pressure generation characteristics in which the sum of the changes in the dynamic pressure in the pump-out direction is larger than that in the changes in the dynamic pressure in the pump-in direction when the rotating body R is biased in the rotational axis direction from the state where the rotating body is floating in the lubricant 28. When such dynamic pressure generation characteristics are attained, a similar effect as in the present embodiment can be obtained. In the present embodiment, the case where the second thrust dynamic pressure generating portion comprises both of the second thrust dynamic pressure groove 48a, which is a pump-in dynamic pressure groove, and the second thrust dynamic pressure groove 48b, which is a pump-out dynamic pressure groove, has been described. In another example, the second thrust dynamic pressure generating portion may be structured only with a pump-out dynamic pressure groove, which can provide a similar effect as in the present embodiment.

The present invention shall not be limited to the aforementioned embodiments, and various modifications, such as design modifications, can be made with respect to the above embodiments based on the knowledge of those skilled in the art. The structure illustrated in each drawing is intended to exemplify an example, and the structure can be appropriately modified to a structure having a similar function, which can provide similar effects.

What is claimed is:
1. A disk drive device comprising:
a base member;
a rotating body;
a bearing unit that is arranged on the base member and is configured to rotatably support the rotating body; and
a drive unit configured to rotate the rotating body, and
wherein the bearing unit includes:
a lubricant holding portion in which lubricant is held between at least part of the base member and at least part of the rotating body;
a first thrust dynamic pressure generating portion configured to generate a first dynamic pressure in a pump-in direction, in which the lubricant is led from an open end portion side of the lubricant holding portion toward an interior of the lubricant holding portion, the first dynamic pressure being generated in a part of the lubricant holding portion where a gap becomes narrower as the rotating body approaches the base member; and
a second thrust dynamic pressure generating portion configured to generate a second dynamic pressure in a pump-out direction, which is opposite to the pump-in direction in which the first dynamic pressure is exerted, the pump-out direction being a direction in which the lubricant is guided from the interior of the lubricant holding portion toward the open end portion side of the lubricant holding portion, and the second dynamic pressure being generated in a part of the lubricant holding portion which is different from the part where the first thrust dynamic pressure generating portion is formed and in which a gap becomes narrower as the rotating body moves away from the base member, and
wherein the first thrust dynamic pressure generating portion and the second thrust dynamic pressure generating portion have dynamic pressure generation characteristics in which, when the rotating body floating in the lubricant is biased in a rotational axis direction to a different position in which the rotating body remains floating, a sum of the changes, responsive to an axial movement of the rotating body and measured with reference to a state before the axial movement, in the sec- ond dynamic pressure in the pump-out direction is larger than that of the changes in the first dynamic pressure in the pump-in direction.

2. The disk drive device according to claim 1, wherein the first thrust dynamic pressure generating portion comprises a first thrust dynamic pressure groove and a first facing surface that faces the first thrust dynamic pressure groove, and wherein the second thrust dynamic pressure generating portion comprises a second thrust dynamic pressure groove and a second facing surface that faces the second thrust dynamic pressure groove, and wherein the first thrust dynamic pressure groove is formed to have a posture in which a depth direction of the first thrust dynamic pressure groove faces toward a first axial direction relative to the axial direction of the rotating body, and the second thrust dynamic pressure groove is formed to have a posture in which a depth direction of the second thrust dynamic pressure groove faces toward a second axial direction, opposite to the first axial direction, and wherein the second thrust dynamic pressure groove comprises a pump-in groove portion, which is arranged concentrically with a rotational center of the rotating body to generate a third dynamic pressure in the pump-in direction, and a pump-out groove portion, which is arranged nearer to an outer circumference than the pump-in groove portion and arranged concentrically with the rotational center to generate a fourth dynamic pressure in the pump-out direction.

3. The disk drive device according to claim 1, wherein the gap distance between the pump-out groove portion and the second facing surface facing the pump-out groove portion is decreased radially outward.

4. The disk drive device according to claim 1, wherein the bearing unit includes:
a sleeve that rotatably supports a shaft of the rotating body and has a circumferentially-extending portion extending outward in the radial direction at the outer circumference of a sleeve open end portion facing the rotating body; and
a flange that is arranged at a position distanced via a gap from a surface, opposite to the rotating body, of the circumferentially-extending portion, the position facing said surface of the circumferentially-extending portion in a thrust direction, and the flange rotating integrally with the rotating body, and wherein the second thrust dynamic pressure generating portion is formed in at least one of a space between opposing surfaces of the flange and the circumferentially-extending portion, and a space between opposing surfaces of the rotating body and the circumferentially-extending portion.

5. The disk drive device according to claim 4, wherein the bearing unit has a cylinder-shaped housing that is circumferentially provided on the sleeve and that makes the flange lie between the circumferentially-extending portion of the sleeve and the housing, and wherein the housing has a housing flat portion at one end of the housing and the first thrust dynamic pressure generating portion is formed between the housing flat portion and the flange.

6. The disk drive device according to claim 5, wherein a hanging member that surrounds the housing is included at the outer circumference of the flange, and the hanging member is fixed to the rotating body with adhesion.

7. The disk drive device according to claim 4, wherein the flange is formed by pressing a metal material.

8. A disk drive device comprising:
a base member;
a rotating body;
a bearing unit that is arranged on the base member and is configured to rotatably support the rotating body; and
a drive unit configured to rotate the rotating body, and
wherein the driving unit comprises:
a magnet fixed to the rotating body; and
a stator core fixed to the base member so as to be opposite to the magnet in a radial direction,
wherein an attracting plate is fixed to the base member so as to be opposite to the magnet in an axial direction and to generate a magnetic attracting force between the magnet and the attracting plate,
wherein the bearing unit includes:
a lubricant holding portion in which lubricant is held between at least part of the base member and at least part of the rotating body;
a first thrust dynamic pressure generating portion configured to generate a first dynamic pressure in a pump-in direction, in which the lubricant is led from an open end portion side of the lubricant holding portion toward an interior of the lubricant holding portion, the first dynamic pressure being generated in a part of the lubricant holding portion where a gap becomes narrower as the rotating body approaches the base member; and
a second thrust dynamic pressure generating portion configured to generate a second dynamic pressure in a pump-out direction, which is opposite to the pump-in direction in which the first dynamic pressure is exerted, the pump-out direction being a direction in which the lubricant is guided from the interior of the lubricant holding portion toward the open end portion side of the lubricant holding portion, and the second dynamic pressure being generated in a part of the lubricant holding portion which is different from the part where the first thrust dynamic pressure generating portion is formed and in which a gap becomes narrower as the rotating body moves away from the base member, and
the disk drive device further comprising:
a radial dynamic pressure generating portion configured to support, in a part of the lubricant holding portion different from the parts where the first thrust dynamic pressure generating portion and the second thrust dynamic pressure generation portion are respectively formed, the rotating body in the radial direction with respect to the base member,
wherein the first dynamic pressure generated by the first thrust dynamic pressure generating portion, the second dynamic pressure generated by the second thrust dynamic pressure generating portion, and a radial dynamic pressure generated by the radial dynamic pressure generating portion as combined is exerted in the pump-in direction as a whole, and
wherein the first thrust dynamic pressure generating portion and the second thrust dynamic pressure generating portion have dynamic pressure generation characteristics in which, when the rotating body floating in the lubricant is biased in a rotational axis direction to a different position in which the rotating body remains floating, a sum of the changes, responsive to an axial movement of the rotating body and measured with reference to a state before the axial movement, in the second dynamic pressure in the pump-out direction is larger than that of the changes in the first dynamic pressure in the pump-in direction.

9. The disk drive device according to claim 8, wherein the first thrust dynamic pressure generating portion comprises a first thrust dynamic pressure groove and a first facing surface that faces the first thrust dynamic pressure groove, and wherein the second thrust dynamic pressure generating portion comprises a second thrust dynamic pressure groove and a second facing surface that faces the second thrust dynamic pressure groove, and wherein the first thrust dynamic pressure groove is formed to have a posture in which a depth direction of the first thrust dynamic pressure groove faces toward a first axial direction relative to the axial direction of the rotating body, and the second thrust dynamic pressure groove is formed to have a posture in which a depth direction of the second thrust dynamic pressure groove faces toward a second axial direction, opposite to the first axial direction, and wherein the second thrust dynamic pressure groove comprises a pump-in groove portion, which is arranged concentrically with a rotational center of the rotating body to generate a third dynamic pressure in the pump-in direction, and a pump-out groove portion, which is arranged nearer to an outer circumference than the pump-in groove portion and arranged concentrically with the rotational center to generate a fourth dynamic pressure in the pump-out direction.

10. The disk drive device according to claim 9, wherein the gap distance between the pump-out groove portion and the second facing surface facing the pump-out groove portion is decreased radially outward.

11. The disk drive device according to claim 8, wherein the bearing unit includes:
   a sleeve that rotatably supports a shaft of the rotating body and has a circumferentially-extending portion extending outward in the radial direction at the outer circumference of an sleeve open end portion facing the rotating body; and
   a flange that is arranged at a position distanced via a gap from a surface, opposite to the rotating body, of the circumferentially-extending portion, the position facing said surface of the circumferentially-extending portion in a thrust direction, and the flange rotating integrally with the rotating body, and
   wherein the second thrust dynamic pressure generating portion is formed in at least one of a space between opposing surfaces of the flange and the circumferentially-extending portion, and a space between opposing surfaces of the rotating body and the circumferentially-extending portion.

12. The disk drive device according to claim 11, wherein the bearing unit has a cylinder-shaped housing that is circumferentially provided on the sleeve and that makes the flange lie between the circumferentially-extending portion of the sleeve and the housing, and wherein the housing has a housing flat portion at one end of the housing and the first thrust dynamic pressure generating portion is formed between the housing flat portion and the flange.

13. The disk drive device according to claim 12, wherein a hanging member that surrounds the housing is included at the outer circumference of the flange, and the hanging member is fixed to the rotating body with adhesion.

14. The disk drive device according to claim 11, wherein the flange is formed by pressing a metal material.

15. The disk drive device according to claim 14, wherein a pump-in groove portion, with which the first thrust dynamic pressure generating portion is structured, and the pump-in groove portion and a pump-out groove portion, with which the second thrust dynamic pressure generating portion is structured, are formed during the formation of the flange.

16. The disk drive device according to claim 11, wherein the flange is formed of a plastic material.

\* \* \* \* \*